(12) United States Patent
Eyre et al.

(10) Patent No.: US 10,305,911 B1
(45) Date of Patent: May 28, 2019

(54) SYSTEMS AND METHODS FOR MANAGING ACCESS TO WEB CONTENT

(71) Applicant: Amazon Technologies, Inc., Seattle, WA (US)

(72) Inventors: Joshua Thomas Eyre, Seattle, WA (US); Ryan Pruden, Seattle, WA (US); Kamlesh Nanda, Bothell, WA (US); Camilla de Oliveira Penna Tavares, Seattle, WA (US); Anthony McCann, Seattle, WA (US); Sai Vishnu Kiran Bhyravajosyula, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 328 days.

(21) Appl. No.: 14/791,921

(22) Filed: Jul. 6, 2015

(51) Int. Cl.
*H04L 29/06* (2006.01)
*H04L 9/32* (2006.01)
*G06F 3/0482* (2013.01)
*G06F 21/36* (2013.01)
*G06F 21/31* (2013.01)

(52) U.S. Cl.
CPC .......... *H04L 63/102* (2013.01); *H04L 9/3271* (2013.01); *H04L 63/101* (2013.01); *G06F 3/0482* (2013.01); *G06F 21/316* (2013.01); *G06F 21/36* (2013.01); *G06F 2221/2103* (2013.01)

(58) Field of Classification Search
CPC ..... H04L 63/101; H04L 63/102; H04L 63/10; H04L 63/104; H04L 63/105; H04L 9/32; H04L 9/3271; G06F 3/0482; G06F 21/316; G06F 21/36; G06F 2221/21; G06F 2221/2103; G06F 2221/2113; G06F 2221/2133; G06F 2221/2141; G06F 2221/2145
See application file for complete search history.

(56) References Cited

U.S. PATENT DOCUMENTS

| | | | |
|---|---|---|---|
| 8,402,548 B1 * | 3/2013 | Muriello | G06F 21/60 726/26 |
| 9,602,508 B1 * | 3/2017 | Mahaffey | H04L 63/0869 |
| 2009/0319270 A1 * | 12/2009 | Gross | G10L 15/22 704/246 |
| 2013/0344859 A1 * | 12/2013 | Abramson | G06Q 50/265 455/418 |
| 2014/0259130 A1 * | 9/2014 | Li | G06F 21/31 726/6 |
| 2014/0344927 A1 * | 11/2014 | Turgeman | H04W 12/06 726/22 |
| 2015/0287043 A1 * | 10/2015 | Michaelis | G06Q 10/063 705/317 |

* cited by examiner

*Primary Examiner* — Ali S Abyaneh
*Assistant Examiner* — Alexander R Lapian
(74) *Attorney, Agent, or Firm* — Eversheds Sutherland (US) LLP

(57) ABSTRACT

Provided are systems and methods for managing access to web content. An example method includes receiving a request to provide a user with access to web content, determining that the user could have one or more cognitive conditions, determining that the web content is not approved for access by the user, presenting an interactive challenge, determining that the user has successfully completed the interactive challenge, sending a web content access request comprising an indication of the user and the web content, receiving an indication that the web content is approved for access by the user, and providing the user with access to the web content.

20 Claims, 7 Drawing Sheets

SYSTEMS AND METHODS FOR MANAGING ACCESS TO WEB CONTENT

BACKGROUND

The World Wide Web (also referred to as the "web") is an information system of interlinked documents that are accessible via the Internet. Users can access document pages (also referred to as "webpages") using a web browser or similar application running on user devices. A website typically refers to a set of related webpages, often hosted by one or more web servers. As the web continues to evolve, users continue to have access to more information, including an increasing number of websites and webpages. The size of the web and the free flow of information on the web can provide a tremendous resource for users, but it can also create issues with regard to protecting some users, such as children, from inappropriate content.

Figure 1:
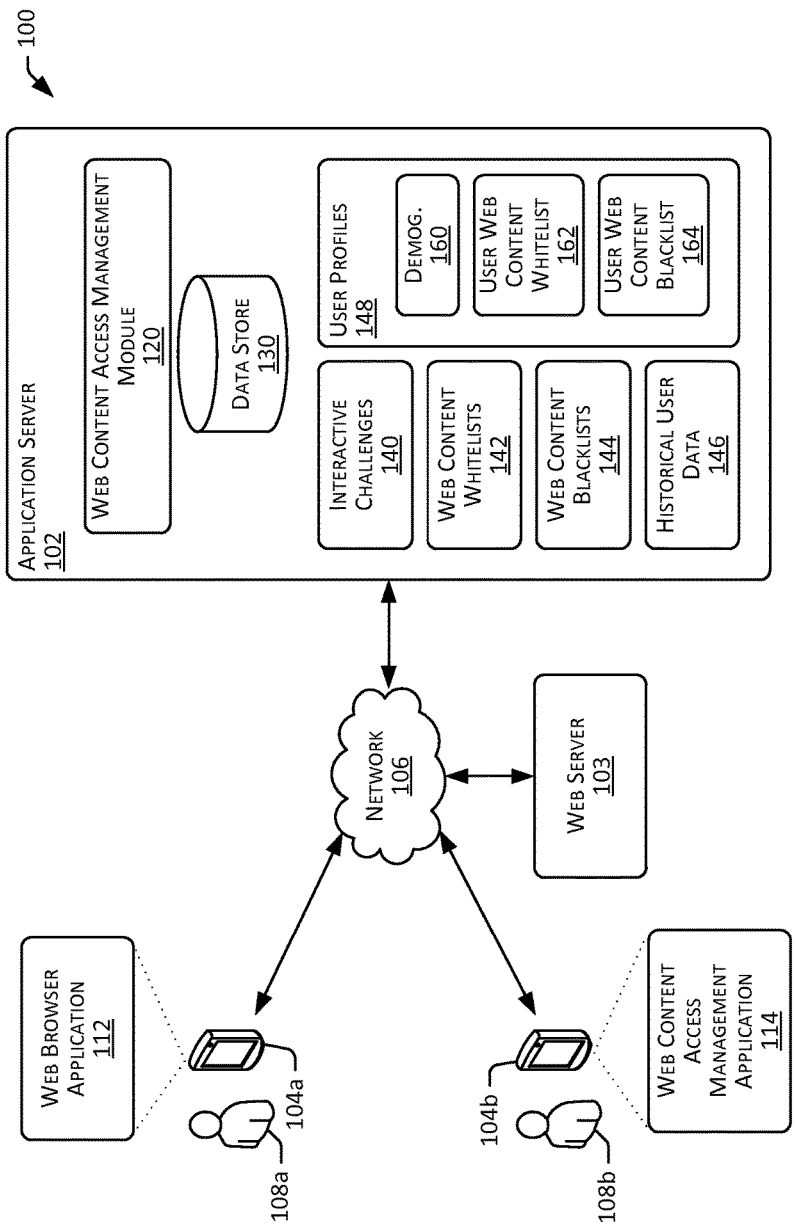
FIG. 1 is a diagram that illustrates an example content distribution environment in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed descriptions thereto are not intended to limit the disclosure to the particular form disclosed, but, to the contrary, the intention is to cover all modifications, equivalents, and alternatives falling within the spirit and scope of the present disclosure as defined by the appended claims.

DETAILED DESCRIPTION

Described herein are systems and methods for managing access to content on the World Wide Web (also referred to as "web content"). Web content can include, for example, websites and webpages accessible via the Internet. In some embodiments, if a child attempts to access web content (e.g., a webpage or a website) that he/she does not have approval to access, then the child can be required to successfully complete an interactive challenge before a corresponding request to access the web content is forwarded to the child's parents, or another person or entity that is monitoring the child's access to content. For example, if John (6 years old) is navigating the World Wide Web (also referred to as the "web") using an Internet browser application of his tablet computer and he selects a hyperlink link to navigate to the home webpage for the Nickelodeon™ website (a website including content specifically geared toward children), the browser application may check to see that John has permission to access the website. If the browser application determines that John does have permission to access the website (e.g., the browser application determines the Nickelodeon™ website is included on a list of approved websites for John), then the browser application may navigate to the webpage, thereby providing John with access to the Nickelodeon™ website. If, however, John selects a hyperlink link to navigate to the home webpage for the ESPN™ website (a sports website including content geared toward adults), the browser application may again check to see that John has permission to access the website. If the browser application determines that John does not have permission to access the website (e.g., the browser application determines that ESPN is not included on a list of approved websites for John), then the browser application may invite John to complete an interactive challenge to initiate a request to access the website. If John successfully completes the challenge, then the browser application may generate a corresponding website access request that is ultimately received by John's parent(s) (or a similar monitor). John's parent can then elect to approve or deny the request. If the request is approved by the parent, then the browser application may allow John to access the website. If the request is not approved by the parent, however, then the browser application may continue to block John from accessing the website.

In some embodiments, an interactive challenge can require some level of competence and effort. For example, an interactive challenge may include a textual description of actions for the user to perform to complete the interactive challenge. One interactive challenge may include moving a displayed cowboy hat from a head of a cowboy to a head of the horse. Such a challenge can be presented via display of an interactive graphical user interface (GUI) that includes instructions stating the following: "You are not allowed to see this website. Place the cowboy hat on the head of the horse to ask your parents for permission to view the website." The instructions may be accompanied by a depiction of a cowboy wearing a cowboy hat and riding a horse, and that allows the user to select and move the cowboy hat from the cowboy to the head of the horse. Thus, the user must be able to do the following to generate a request to view web content: (1) read and understand the textual description to know what actions need to be performed to successfully complete the interactive challenge; and (2) be able to perform the actions to successfully complete the interactive challenge. Such competence and/or effort requirements can help to ensure that a child is not haphazardly generating requests to access websites that could overwhelm a parent. For example, if a child can submit a request to access a website by simply selecting a "Request Access" button that is displayed each time he/she encounters an unapproved website that he/she does not have permission to access, the child may simply hit the button each time that he/she encounters an unapproved website. As a result, the child's parent may be inundated with numerous requests to access any number of websites, despite the fact that the child may not be that interested in accessing the websites. By requiring the child to complete an interactive challenge, such as that described herein, the child may be encouraged to submit a request to access a website only if he/she has a heightened level of interest in accessing the website. That is, a child attempting to access a website may not want to put forth the effort required by the interactive challenge if he/she is not very interested in accessing the website.

Interactive challenges can take any variety of forms. In some embodiments, as described above, an interactive challenge can include a textual description of actions for the user to perform to complete the interactive challenge, and an interactive interface that enables the user to perform the actions. For example, as described above, one interactive challenge may include moving a displayed cowboy hat from a head of a cowboy to a head of a horse. An interactive challenge may include other game-like interactive challenges, such as moving a ball through a hoop and/or the like. In some embodiments, an interactive challenge can be educational. For example, an interactive challenge may instruct the user to move pictures of state capitals onto the corresponding states in a displayed map of the United States.

Although certain embodiments are described in the context of web content (e.g., websites and webpages) for the purpose of illustration, the embodiments described herein can be employed in any suitable context. For example, similar embodiments can be employed for managing access to the content of electronic books (e-books), portions of applications (e.g., levels of a video game), and/or the like.

Accordingly, some of the embodiments described herein can provide for managing children's access to web content, such as websites and webpages, by using interactive challenges as a hurdle for generating a corresponding request to access web content. The hurdle presented by such interactive challenges may encourage children to submit requests to access web content only if they are truly interested in accessing the web content, thereby preventing a monitor, such as a child's parent, from being unnecessarily inundated with requests to access web content.

Although certain embodiments are described with regard to children for the purposes of illustration, similar embodiments can be employed for various types of individuals and/or groups of individuals. For example, the techniques described herein for limiting access to children, e.g., including the use of interactive challenges, can be applied for use with other individuals or groups of individuals having one or more cognitive conditions, such as persons with conative (or intellectual) limitations or disabilities, For example, if a user is identified as having a conative (or intellectual) limitation or disability that makes it difficult for the user to view or otherwise interact with a particular type of web content, and the user attempts to access that type of web content, they may be subject to an approval process, including use of an interactive challenge to submit a request for approval to view the content. Thus, a monitor such as a parent or healthcare provider may be able to regulate the content provided to the individual or group of individuals.

FIG. 1 is a diagram that illustrates an example content distribution environment ("environment") 100 in accordance with one or more embodiments. The environment 100 may include an application server 102, a web server 103 and/or one or more user devices (or client devices) 104 (e.g., user devices 104a and 104b) communicatively coupled via a communications network 106. As described herein, the user devices 104 may be used by (or otherwise associated with) one or more users 108 (e.g., a user 108a and a user 108b). Furthermore, a first of the users 108 (e.g., a "child" user 108a) may be a child, and a second of the users 108 (e.g., a "parent" user 108b) may be a parent of the child (or another person or entity) tasked with overseeing monitoring of web content (e.g., websites and/or webpages) that is accessible by the child.

The network 106 may include an element or system that facilitates communication between the entities of the environment 100. For example, the network 106 may include an electronic communications network, such as the Internet, a local area network (LAN), a wide area network (WAN), a wireless local area network (WLAN), a cellular communications network, and/or the like. In some embodiments, the network 106 can include a single network or a combination of networks.

A user device 104 may include any variety of electronic devices, such as one or more electronic computing devices. A user device 104 may include, for example, a desktop computer, and/or one or more mobile computing devices, such as an electronic reader (e-reader), a laptop computer, a tablet computer, a personal digital assistant (PDA), a smartphone, a wearable computer device (e.g., a smart watch), a gaming console, and/or the like. In some embodiments, a user device 104 can include a networked device capable of communicating information via the network 106. A user device 104 may be a client of the application server 102. In some embodiments, a user device 104 may include various input/output (I/O) interfaces, such as a display screen (e.g., for displaying graphical user interfaces (GUIs)), an audible output interface (e.g., a speaker), an audible input interface (e.g., a microphone), an image acquisition interface (e.g., a camera), a biometric interface (e.g., an eye or fingerprint scanner), a keyboard, a pointer/selection device (e.g., a mouse, a trackball, a touchpad, a touchscreen, a stylus or the like), a printer, and/or the like.

In some embodiments, a user device 104 can include general computing components and/or embedded systems optimized with specific components for performing specific tasks. A user device 104 (e.g., the first user device 104a) may include, for example, a web browser application 112 (also referred to herein as a "browser application" or a "browser"). The browser application 112 may be a software application that is executed by the user device 104 for retrieving, presenting, and traversing information resources on the web. For example, a child user 108a may interact with a browser application 112 on the first user device 104a to navigate to different websites and webpages of the web. Upon attempting to access web content that the child is not allowed to access (e.g., the ESPN™ website), the browser application 112 may present an interactive challenge on the user device 104a for completion by the child user 108a. Upon successful completion of the interactive challenge by the child user 108a, the browser application 112 may submit a corresponding web content access request to the application server 102. The web content access request may identify the child user 108a and the web content that the child user 108a is attempting to access (e.g., the access request may identify John and the ESPN™ website). A user device 104 (e.g., the second user device 104b) may include, for example, a web content access management application 114 (also referred to herein as a "management application"). The web content access management application 114 may be a software application that is executed by the user device 104 for receiving web content approval requests (e.g., from the application server 102), providing a monitoring GUI to enable approval/disapproval of the web content approval request (e.g., by a parent user 108b), and/or providing corresponding monitor decision messages (e.g., to the application server 102). In some embodiments, the programs or applications of a user device 104 (e.g., a browser application 112 and/or a web content access management application 114) can include modules having program instructions that are executable by a computer system to perform some or all of the functionality described herein with regard to the user device 104. In some embodiments, a user device 104 can include one or more computer systems similar to that of the computer system 1000 described below with regard to at least FIG. 7.

The web server 103 may include an electronic computing device having network connectivity and capable of providing one or more services to network clients, such as the user devices 104. These services may include receiving, processing, storing, and/or serving or otherwise providing data, such as serving webpages and related information to one or more user devices 104. For example, the web server 103 may serve the content for the home page of the Nickelodeon™ website to the child's user device 104*a*, in response to receiving a corresponding request for the page from the child's user device 104*a*. Although certain embodiments are described with regard to a single server for the purpose of illustration, embodiments may include employing multiple servers, such as a plurality of distributed web servers. In some embodiments, the web server 103 can include one or more computer systems similar to that of the computer system 1000 described below with regard to at least FIG. 7.

The application server 102 may include an electronic computing device having network connectivity and capable of providing one or more services to network clients, such as the user devices 104. These services may include receiving, processing, storing, and/or serving or otherwise providing data, such as interactive challenges, web content whitelists, and web content blacklists, and related information. In some embodiments, the application server 102 can include a web content access management module (or "access management module") 120. As described herein, the access management module 120 may provide for maintaining a list of web content and associated addresses that are accessible and/or not accessible by one or more users (e.g., a whitelist and/or a blacklist for websites and/or webpages), providing interactive challenges for use by web browser applications, receiving web content access requests (e.g., from the child user device 104*a*), providing web content approval requests (e.g., to the parent user device 104*b*), receiving monitor decision messages (e.g., from the parent user device 104*b*), and/or providing corresponding access messages (e.g., to the child user device 104*a*). Although certain embodiments are described with regard to a single server for the purpose of illustration, embodiments may include employing multiple servers, such as a plurality of distributed application servers. In some embodiments, the application server 102 can include one or more computer systems similar to that of the computer system 1000 described below with regard to at least FIG. 7.

In some embodiments, the application server 102 can include or otherwise have access to a data store 130. The data store 130 may include a non-transitory computer-readable medium for storing data thereon. The data store 130 may store, for example, the access management module 120, one or more interactive challenges 140, one or more web content whitelists 142, one or more web content blacklists 144, historical user data 146, one or more user profiles 148, and/or the like. Although certain embodiments are described with regard to a single data store 130 for the purpose of illustration, embodiments may include employing multiple data stores 130, such as a plurality of distributed data stores 130.

The interactive challenges 140 can include content that can be served to a user device 104 for presentation to a user 108. For example, one of the interactive challenges 140 may include content of the above described interactive GUI that provides the interactive challenge for placing a hat on a horse. For example, the interactive challenge 140 may include content that can be rendered by the user device 108*a* to cause the display of an interactive challenge GUI that includes the instructions stating the following: "You are not allowed to see this website. Place the cowboy hat on the head of the horse to ask your parents for permission to view the website." A cowboy wearing a cowboy hat and riding a horse is depicted, that allows the user to select and move the cowboy hat from the cowboy to the head of the horse. Such an example interactive challenge 140 is described in more detail herein with regard to at least FIG. 3.

In some embodiments, one or more interactive challenges 140 may be grouped together. For example, a first set of interactive challenges 140 may include one or more interactive challenges 140 that are determined to be relatively easy to complete, a second set of interactive challenges 140 may include one or more interactive challenges 140 that are determined to be moderately difficult to complete, and a third set of interactive challenges 140 may include one or more interactive challenges 140 that are determined to be relatively difficult to complete. In some embodiments, the interactive challenges 140 can be associated with certain user demographics, and can be provided as interactive challenges 140 for users 108 associated with the respective demographic(s). For example, the first, second, and third sets of interactive challenges 140 may be associated with age ranges of 2-4 years old, 5-7 years old, and 8-10 years old, respectively. Thus, for example, easier interactive challenges 140 may be associated with younger children, whereas more difficult interactive challenges 140 may be associated with older children. In an example embodiment, one or more interactive challenges 140 of the first (easy) set of interactive challenges 140 can be provided to user devices 104 for users 108 who are 2-4 years old, one or more interactive challenges 140 of the second (moderately difficult) set of interactive challenges 140 can be provided to user devices 104 for users 108 who are 5-7 years old, and/or one or more interactive challenges 140 of the third (difficult) set of interactive challenges 140 can be provided to user devices 104 for users 108 who are 8-10 years old. The interactive challenges 140 can be presented to users 108 as described herein. Although certain embodiments are described with regard to the age demographic for the purpose of illustration, any number and combination of demographic information can be used. For example, interactive challenges can be grouped based on combinations of age and gender. For example, the first, second, and third sets of interactive challenges 140 can be associated with boys with age ranges of 2-4 years old, 5-7 years old, and 8-10 years old, respectively, and fourth, fifth, and sixth sets of interactive challenges 140 can be associated with girls with age ranges of 2-4 years old, 5-7 years old, and 8-10 years old, respectively. Accordingly, users 108 may be provided with demographically (e.g., age and/or gender) appropriate interactive challenges 140.

A web content whitelist (also referred to herein as a "whitelist") 142 can include a listing of web content (e.g., websites and/or webpages, and respective associated addresses) that is approved for viewing by one or more children. For example, a web content whitelist 142 may include a listing of websites and corresponding associated addresses that have been determined to be kid-friendly, such as the Nickelodeon™ website, the Cartoon Network™ website, the Disney TV™ website, and/or the like. A web content blacklist (also referred to herein as a "blacklist") 144 can include a listing of web content (e.g., websites and/or webpages, and respective associated addresses) that is disapproved for viewing by one or more children. That is, the web content blacklist 144 may include a listing of web content (e.g., websites and/or webpages, and respective associated addresses) that children are blocked from viewing. For example, a web content blacklist 144 may include a listing of websites and corresponding associated addresses that have been determined to be not kid-friendly, such as an adult dating website, and/or the like.

Historical user data 146 may include information gathered from one or more users 108. This can include requests received from users 108 (e.g., web content access requests generated in response to children successfully completing interactive challenges 140), approval/disapproval messages received from users 108 (e.g., monitor decision messages generated in response to parents approving/disapproving access to web content), various metrics concerning access requests and/or approval/disapproval messages, and/or the like. The metrics can include, for example, statistics relating to the number of web content access requests for a website by a particular demographic (e.g., age and gender) of children, the number of monitor decision messages indicating approvals and/or disapprovals of access to one or more websites (or webpages) for a particular demographic of children, and/or the like. In some embodiments, the historical user data 146 can include information collected by the application server 102 from any number of users 108 and/or user devices 104. That is, the historical user data 146 may include data that is crowd-sourced from one or more users 108. As described herein, the historical user data 146 can be used, for example, to determine what web content is kid-friendly (e.g., what content is included on a web content whitelist 142 and/or a web content blacklist 144), to aid parents in determining whether or not to grant their child's request to access web content (e.g., to provide statistics indicating whether other parents have allowed children of a similar demographic to access web content to which access is requested), and/or the like. Although certain examples of the uses of historical user data 146 are provided for the purpose of illustration, it will be appreciated that the historical user data 146 can include any variety of data and may be used for a variety of purposes.

A user profile 148 can include information that is associated with a user 108. For example, a user profile 148 for a user 108 may include demographic information 160 for the user 108, such as a name, age, gender, content preferences, and/or the like for the user 108. In some embodiments, a user profile 148 for a user 108 can include a user web content whitelist (also referred to as a "user whitelist") 162 and/or a user web content blacklist (also referred to as a "user blacklist") 164 that is associated with the user 108. As described herein, a user whitelist 162 can include a listing of web content (e.g., websites and/or webpages, and respective associated addresses) that is approved for viewing by the associated user 108. For example, a user whitelist 162 of a user profile 148 for the child user 108*a* may include a listing of websites and corresponding associated addresses that have been determined to be kid-friendly and/or approved by the parent user 108*b*, such as the Nickelodeon™ website, the Cartoon Network™ website, the Disney TV™ website, and/or the like. A user blacklist 164 can include a listing of web content (e.g., websites and/or webpages, and respective associated addresses) that is disapproved for viewing by children. That is, a user blacklist 164 may include a listing of web content (e.g., websites and/or webpages, and respective associated addresses) that the associated user 108 is blocked from viewing. For example, a user blacklist 164 of a user profile 148 for the child user 108*a* may include a listing of websites and corresponding associated addresses that have been determined to be not kid-friendly and/or disapproved by the parent user 108*b*, such as an adult dating website, and/or the like. In some embodiments, a user whitelist 162 and/or a user blacklist 164 of a user profile 148 for a user 108 may be stored locally on a user device 104 associated with the user 108. For example, a user whitelist 162 and/or a user blacklist 164 of the user profile 148 for the child user 108*a* may be sent, by the application server 102, to the user device 104*a*. The user device 104*a* may store the user whitelist 162 and/or the user blacklist 164 in a memory of the user device 104*a*, and the browser application 112 may access and use the lists 162 and/or 164 as described herein. In some embodiments, a user profile 148 for a user 108 may identify a monitor that includes a person (or other entity) responsible for monitoring the user's access to web content. For example, a user profile 148 for the child user 108*a* (John) may identify the parent user 108*b* (John's mother, Jane) as a web content monitor.

In some embodiments, web content whitelists 142 and/or web content blacklists 144 may be maintained by a provider. For example, a content provider managing the application server 102 and/or the web content access management module 120 may proactively add and/or remove web content (e.g., websites and/or webpages, and respective associated addresses) to/from the web content whitelist 142 and/or the web content blacklist 144. In some embodiments, a web content whitelist 142 and/or a web content blacklist 144 maintained by the application server 102 may act as a default listing that can be customized for one or more children in particular. For example, as described herein, a web content whitelist 142 and a web content blacklist 144 may be initially associated with a user profile 148 for the child user 108*a*. The parent user 108*b* may add and/or remove web content from the web content lists 142 and 144 to generate customized user lists 162 and/or 164 for the child user 108*a*. In some embodiments, customized user lists 162 and/or 164 can be updated based on the approval or disapproval of access to web content by a parent. For example, if the child user 108*a* completes an interactive challenge 140 to generate a request to access the ESPN™ website (which is not currently on either of a user whitelist 162 or a user blacklist 164 associated with the user profile 148 for the child user 108*a*) and the parent user 108*b* approves access to the ESPN™ website, then the ESPN™ website may be added to the user whitelist 162 associated with the user profile 148 for the child user 108*a*. If, however, the parent user 108*b* does not approve (or otherwise denies) access to the ESPN™ website, then the ESPN™ website may be added to the user blacklist 164 associated with the user profile 148 for the child user 108*a*. Accordingly, the user lists 162 and/or 164 for a user 108 can be customized for that particular user 108.

Figure 2:
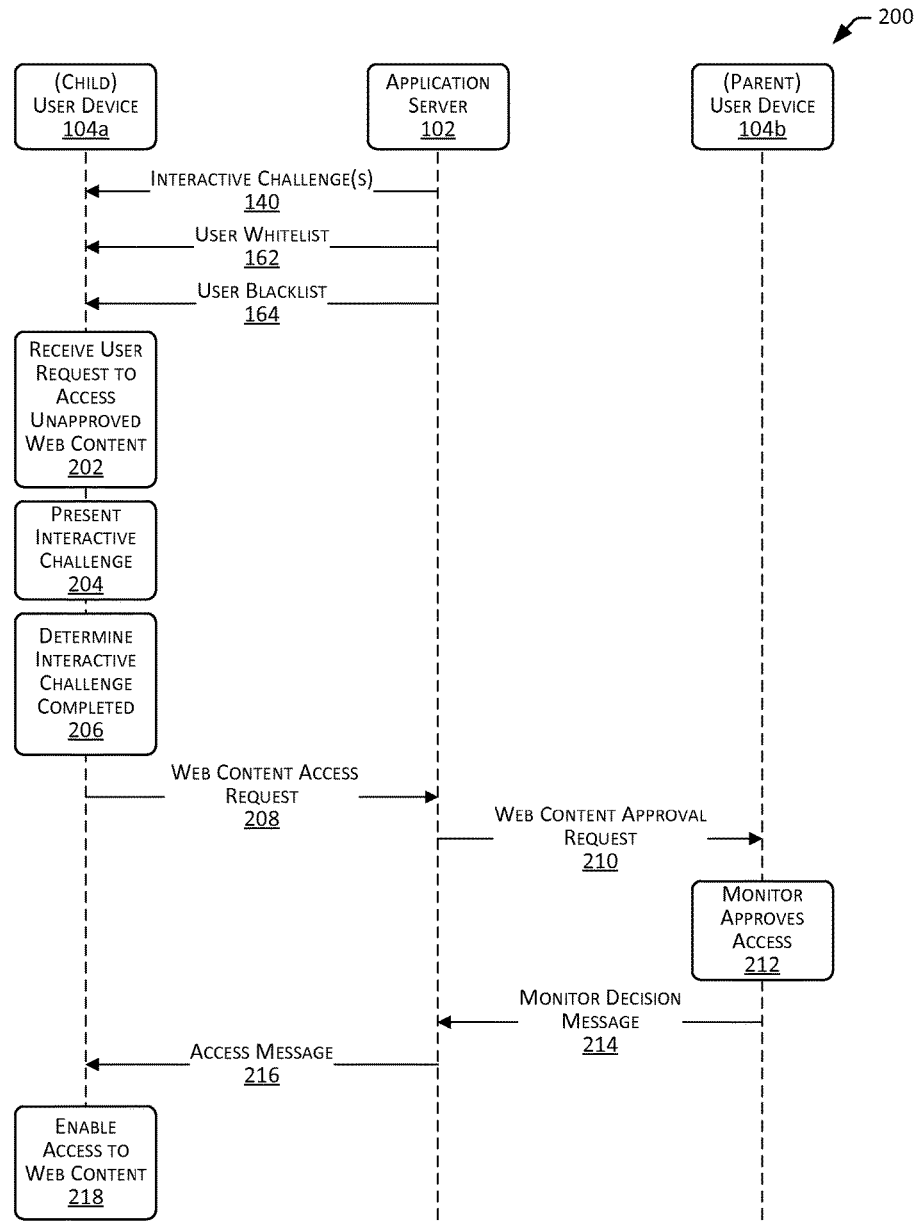
FIG. 2 is a process diagram that illustrates an example process for managing access to web content in accordance with one or more embodiments.

FIG. 2 is a process diagram that illustrates an example process 200 for managing access to web content in accordance with one or more embodiments. As described herein, the process illustrates an example in which a child user 108*a* attempts to access unapproved web content (e.g., the ESPN™ website), the child user 108*a* successfully completes an interactive challenge 140 to generate a request to access the web content, the parent user 108*b* approves the request, and the child user 108*a* is provided with access to the web content (e.g., the child user 108*a* is allowed to view and navigate the ESPN™ website). As depicted, the application server 102 may send one more interactive challenges 140, a user whitelist 162 and/or a user blacklist 164 to the "child" user device 104*a* for the child user 108*a*. The child user 108*a* may be a 6-year-old boy, John, and the interactive challenges 140 may include one or more interactive challenges 140 that are determined to be demographically appropriate for the child user 108*a*. For example, the interactive challenges 140 may include the above described second set of interactive challenges 140 that is associated with boys of ages 5-7 years old. The interactive challenges 140 can include, for example, the above described interactive challenge 140 for placing a hat on a horse. The user whitelist 162 may be the user whitelist 162 associated with the user profile 148 for the child user 108a, and may include a listing of websites that is approved for access by the child user 108a, such as the Nickelodeon™ website, the Cartoon Network™ website, the Disney TV™ website, and/or the like. The user blacklist 164 may be the user blacklist 164 associated with the user profile 148 for the child user 108a, and may include a listing of websites and corresponding associated addresses that are disapproved for access by the child user 108a, such as an adult dating website, and/or the like. The one or more interactive challenges 140, the user whitelist 162, and/or the user blacklist 164 may be stored locally on the child user device 104a.

The process 200 may include the user device 104a receiving a user request to access unapproved web content (block 202). This may include, for example, the browser application 112 receiving a selection (by the child user 108a) of a hyperlink to the home page of the ESPN™ website while the child user 108a is navigating (or "surfing") the web using the browser application 112. The browser application 112 may determine that the web content (e.g., the ESPN™ website) is not approved by comparing the hyperlink, such as the address of the ESPN™ website, to hyperlinks and/or addresses of websites listed in the user whitelist 162 and the user blacklist 164. For example, the browser application 112 may determine that the ESPN™ website is not approved based on the hyperlink and/or address of the website not being listed in the user whitelist 162. Further, the browser application 112 may determine that the ESPN website is not disapproved (and thus, subject to approval) based on the hyperlink and/or address of the website not being listed in the user blacklist 164.

The process 200 may include the user device 104a presenting an interactive challenge 140 (block 204). For example, in response to determining that the ESPN™ website is not approved (and subject to approval), the browser application 112 may select and display an interactive challenge 140, such as the above described interactive challenge 140 for placing a cowboy hat on a horse, for completion by the child user 108a. The browser application 112 may cause the display of the interactive challenge 140, for example, on a display of the user device 104a, and may provide the child user 108a with an opportunity to read the instructions and complete the challenge by performing the associated action moving the cowboy hat from the cowboy to the head of the horse. For example, the displayed challenge may enable the child user 108a to place his finger on the cowboy hat and slide his finger across the screen onto (or near) the horse's head to complete the interactive challenge 140.

In response to determining that the child has completed the interactive challenge 140 (block 206), the user device 104a may send a corresponding web content access request 208 to the application server 102. For example, in response to determining that the child user 108a has completed the interactive challenge 140, the browser application 112 may send a web content access request 208 to the application server 102 that identifies the child user 108a and the web content he is requesting access to (e.g., the web content access request 208 may identify John and the ESPN™ website). The application server 102 may identify the person responsible for monitoring the user's access to web content, and may send a corresponding web content approval request 210 to that person's user device 104b. For example, the application server 102 may determine that the parent user 108b (Jane) is responsible for monitoring the access to web content by the child user 108a (e.g., based on Jane being listed as a monitor in John's user profile 148), and may send a corresponding web content approval request 210 to the user device 104b. The web content approval request 210 may identify the child user 108a and the web content to which access is being requested (e.g., the web content approval request 210 may identify John and the ESPN™ website).

In response to receiving the web content approval request 210, the parent user device 104b may provide the monitor (e.g., parent user 108b (Jane)) with an opportunity to approve/disapprove the web content approval request 210, and in response to determining that the monitor (e.g., the parent user 108b) has approved the web content approval request 210 (block 212), the user device 104b may send a corresponding "approval" monitor decision message 214 to the application server 102. For example, in response to receiving the web content approval request 210 identifying the child user 108a and the web content to which access is being requested (e.g., the web content approval request 210 identifying John and the ESPN™ website), the web content access management application 114 of the user device 104b may cause the display of an interactive GUI on a display of the parent user device 104b that requests that the parent user 108b select to approve or disapprove the web content approval request 210. In response to the parent user 108b selecting to approve the web content approval request 210, the web content access management application 114 may send a corresponding "approval" monitor decision message 214 to the application server 102. The "approval" monitor decision message 214 may identify the child user 108a, the web content to which access is being requested, and the decision (e.g., the monitor decision message 214 may identify John, the ESPN™ website, and the decision of "approved"). The application server 102 may send a corresponding "approved" access message 216 to the child user device 104a. The "approved" access message 216 may identify the child user 108a, the web content to which access is being requested, and the decision (e.g., the access message 216 may identify John, the ESPN™ website, and the decision of "approved"). In response to receiving the "approved" access message 216 approving access to the web content, the user device 104a may enable access to the web content (block 218). For example, in response to receiving the "approved" access message 216, the browser application 112 may enable the child user 108a to navigate to some or all of the webpages of the ESPN™ website (e.g., some or all of the webpages hosted by an ESPN™ web server 103). For example, when the child user 108a selects the hyperlink to the home webpage for the ESPN™ website, the browser application 112 may load and display the page. For example, as opposed to presenting an interactive challenge, the browser application 112 may send a web content request for the home webpage for the ESPN™ website to the web server 103, receive the web content request for the home webpage for the ESPN™ website from the web server 103, and render the page to cause display of the home webpage for the ESPN™ website on the child user device 104a.

Figure 3:
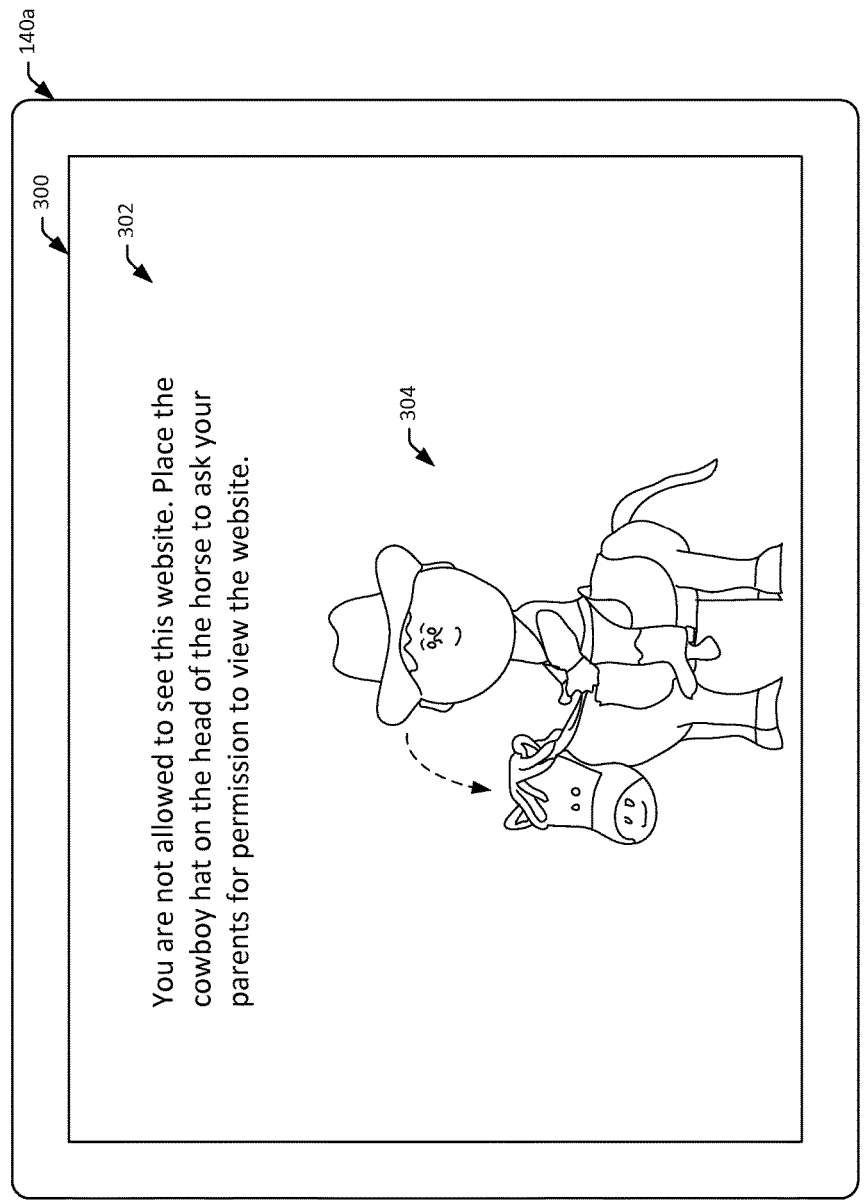
FIG. 3 illustrates a display of an example interactive challenge in accordance with one or more embodiments.

FIG. 3 illustrates the display of an example interactive challenge 140a in accordance with one or more embodiments. The interactive challenge 140a may be the same or similar to the above described interactive challenge 140 that includes moving a displayed cowboy hat from a head of a cowboy to a head of a horse. As depicted, the interactive challenge 140a can include a challenge graphical user interface (GUI) 300 that includes instructions 302 stating the following: "You are not allowed to see this website. Place the cowboy hat on the head of the horse to ask your parents for permission to view the website." A cowboy wearing a cowboy hat and riding a horse 304 is depicted, that allows the user to select and move the cowboy hat from the cowboy to the head of the horse. The interactive challenge 140*a* may be displayed, for example, on a display of the user device 104*a*, and may provide a child (e.g., the user 108*a*) with an opportunity to read the instructions 302 and complete the interactive challenge 140*a* by performing the associated action of moving the cowboy hat from the head of the cowboy to the head of the horse. For example, the child (e.g., user 108*a*) may place his/her finger on the cowboy hat and slide his/her finger on the screen onto (or near) the horse's head to complete the interactive challenge 140 (e.g., as indicated by the dashed arrow). The dashed arrow is provided for illustration, but may or may not be displayed in the actual implementation of the interactive challenge 140*a*.

Figure 4:
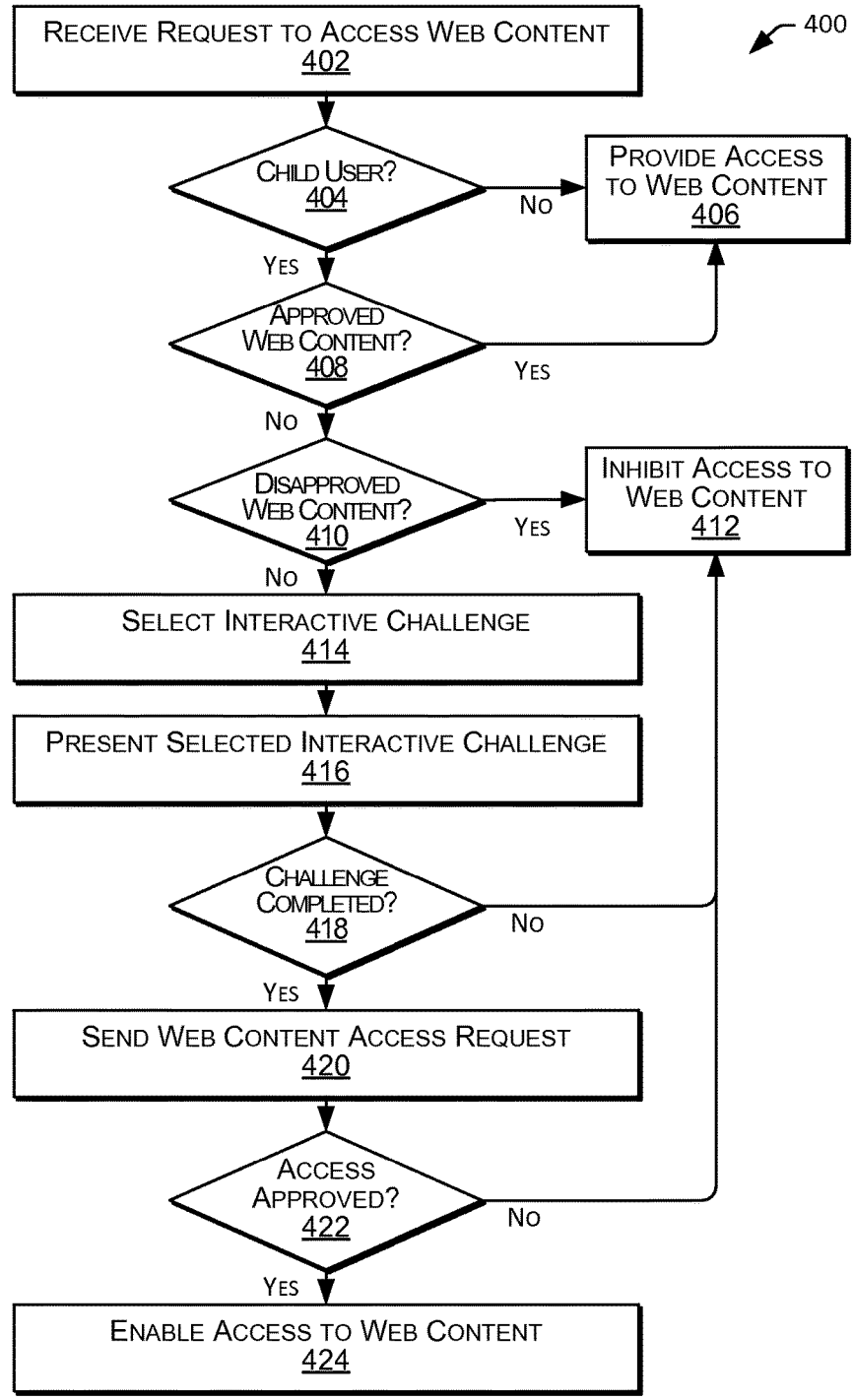
FIGS. 4-6 are flow diagrams that illustrate example methods for managing access to web content in accordance with one or more embodiments.
Figure 5:
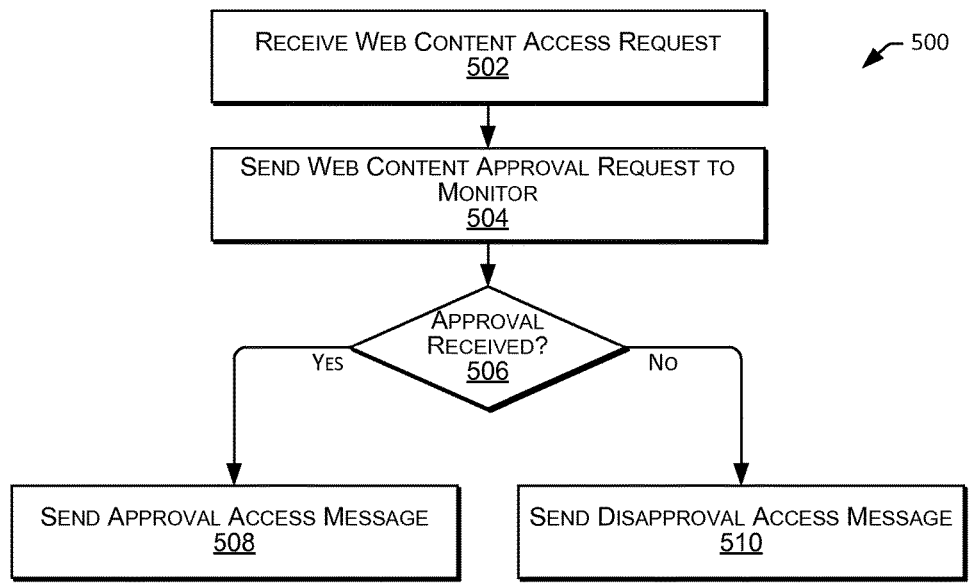
Figure 6:
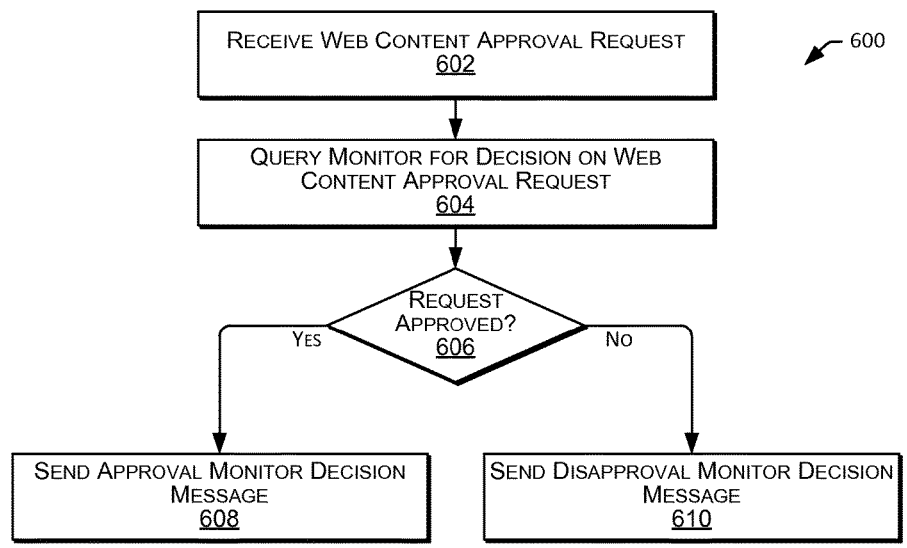

FIGS. 4-6 are flow diagrams that illustrate example methods for managing access to web content in accordance with one or more embodiments. FIG. 4 is a flow diagram that illustrates an example method 400 for managing access to web content in accordance with one or more embodiments. In some embodiments, some or all of the operations of the method 400 can be performed by a child's user device 104 (e.g., some or all of the operations of the method 400 can be performed by a browser application 112 of the user device 104*a*).

Method 400 can include receiving a request to access web content (block 402). In some embodiments, receiving a request to access web content can include a browser application 112 of the user device 104*a* receiving a user request to access web content. For example, the browser application 112 of the child user device 104*a* may receive a request to navigate to the home page of the ESPN™ website. Such a request may be generated as a result of the child user 108*a* selecting a hyperlink (e.g., www.espn.com) while navigating (or "surfing") the web using the browser application 112.

Method 400 can include determining whether a request to access web content is associated with a child user (block 404). In some embodiments, determining whether a request to access web content is associated with a child user (block 404) can include the browser application 112 of a the user device 104*a* determining whether the user 108*a* associated with the request to access web content is less than a threshold age. For example, the browser application 112 of the child user device 104*a* may determine that the user 108*a* requesting to visit the ESPN™ home page is a child if the child user 108*a* signed-in to the device 104*a* and/or the web content access management application 114 using a log-in for his/her account, the threshold age is 12 years of age, and the user profile associated with the account for the child indicates that he/she is 6 years old. In some embodiments, a determination of an age of the child may be based on a version of the demographic profile 160 for the user 108 (e.g., stored locally on the user device 104). In some embodiments, determining whether a request to access web content is associated with a child user can include the browser application 112 of the user device 104*a* determining whether the request is received via a device or an application associated with a child. For example, the user device 104*a* may be a child device (e.g., a kid-friendly tablet computer designed for use by a child) and/or the browser application 112 may be a child browser (e.g., a kid-friendly browser designed for use by a child), and the browser application 112 of the child user device 104*a* may determine that the user 108*a* requesting to visit the ESPN™ home page is a child based on the access being requested via a child user device (e.g., the user device 104*a*) and/or a child browser (e.g., the browser application 112).

Method 400 can include, in response to determining that a request to access web content is not associated with a child user, providing access to the web content (block 406). In some embodiments, providing access to the web content can include allowing the user 108 to view or otherwise interact with the web content. For example, if the browser application 112 on the user device 104*b* determines that a request to navigate to the home page of the ESPN™ website is not associated with a child user 108 (e.g., the request was submitted by the user 108*b* on the user device 104*b*), then the browser application 112 may provide the user 108 with access to some or all of the webpages of the ESPN™ website, including the home page of the ESPN website. For example, the browser application 112 may send a web content request for the home webpage for the ESPN™ website to the web server 103, receive the content for the home webpage for the ESPN™ website from the web server 103, and render the web content to cause display of the home webpage for the ESPN™ website on the user device 104. That is, for example, the browser application 112 may enable the user 108 to navigate to some or all of the webpages of the ESPN website (e.g., some or all of the webpages hosted by an ESPN™ web server 103).

Method 400 can include, in response to determining that a request to access web content is associated with a child user, determining whether the requested web content is approved for viewing by the user (block 408). In some embodiments, determining whether the requested web content and respective associated addresses are approved for viewing by the user can include the browser application 112 determining whether the web content and respective associated addresses are listed or otherwise identified in a user whitelist 162. Continuing with the above example, the browser application 112 may search a user whitelist 162 (e.g., stored locally on the user device 104) for an entry, such as a hyperlink and/or address, matching or otherwise relating to the ESPN™ website (e.g., a listing of "www.espn.com"). The browser application 112 may determine that the home page of the ESPN™ website and/or the ESPN™ website is web content that is approved for viewing by the user 108 if, for example, the user whitelist 162 includes an entry matching or otherwise relating to the ESPN™ website (e.g., includes an address listing of "www.espn.com/*"). The browser application 112 may determine that the home page of the ESPN™ website and/or the ESPN™ website is not web content that is approved for viewing by the user 108 if, for example, the user whitelist 162 does not include an entry, such as a hyperlink and/or address, matching or otherwise relating to the ESPN™ website. Method 400 can include, in response to determining that the requested web content is approved for viewing by the user, providing access to the web content (block 406).

Method 400 can include, in response to determining that the requested web content is not approved for viewing by the user, determining whether the requested web content and respective associated addresses are disapproved for viewing by the user (block 410). In some embodiments, determining whether the requested web content is disapproved for viewing by the user can include the browser application 112 determining whether the web content and respective associated addresses are listed or otherwise indicated in a user blacklist 164. Continuing with the above example, the browser application 112 may search a user blacklist 164 (e.g., stored locally on the user device 104) for an entry, such as a hyperlink and/or address, matching or otherwise relating to the ESPN™ website (e.g., "www.espn.com"). The browser application 112 may determine that the home page of the ESPN™ website and/or the ESPN™ website is web content that is disapproved for viewing by the user 108 if, for example, the user blacklist 164 includes an entry matching or otherwise relating to the ESPN™ website (e.g., includes an address listing of "www.espn.com/*"). The browser application 112 may determine that the home page of the ESPN™ website and/or the ESPN™ website is not web content that is explicitly disapproved for viewing by the user 108 (e.g., access to the web content is not explicitly allowed or explicitly blocked) if, for example, the user blacklist 164 does not include an entry, such as a hyperlink and/or address, matching or otherwise relating to the ESPN™ website (e.g., www.espn.com/*). Method 400 can include, in response to determining that the requested web content is disapproved for viewing by the user, inhibiting access to the web content (block 412).

In some embodiments, inhibiting access to the web content (block 412) can include, for example, blocking access to the web content by the user 108. Continuing with the above example, if it is determined that the ESPN™ website is disapproved, the browser application 112 may not display the home page for the ESPN website, and/or may not allow the user 108 to navigate to or view any of the pages of the ESPN™ website. In some embodiments, if the user 108 attempts to navigate to a disapproved web content, a "block content" page can be displayed that indicates that the user is inhibited from accessing the web content, and/or may include a listing of suggested related web content that is approved. For example, the browser application 112 may display a page that states: "You are not allowed to view this website," along with a hyperlink to a home page for the ESPN™ for kids website (e.g., located at "www.espnkids.com") that is listed on the user whitelist 162 and determined to be related to the home page of the ESPN website for which access was requested.

In some embodiments, a user may be inhibited from accessing certain web content and/or submitting an additional request to access the web content if an access request for the user to access the web content is pending (e.g., an access request for the web content has been submitted in response to the user completing an interactive challenge, but has not yet been approved or disapproved). For example, if John completes an interactive challenge 140 in an effort to access the ESPN™ website such that a corresponding web content access request 208 and/or web content approval request 210 are generated, and John attempts to access the ESPN™ website again, before his mother Jane has approved or disapproved the request, John may be blocked from accessing ESPN™ website and may not be provided an opportunity to complete an interactive challenge 140. In such an instance, a "block content" page can be displayed that indicates that the user is inhibited from accessing the web content, and/or may include a listing of suggested related web content that is approved. For example, the browser application 112 may display a page that states: "You have already submitted a request to view this website, and the request has not yet been approved" along with a hyperlink to a home page for the ESPN™ for kids website (e.g., "www.espnkids.com") that is listed on the user whitelist 162 and determined to be related to the home page of the ESPN website for which access was requested. In some embodiments, an indication of web content (e.g., a web address) may be at least temporarily added to the user web content blacklist 164 while the request is pending. If the request is approved, the indication of the web content may be removed from the user web content blacklist 164 and may be added to the user web content whitelist 162. If the request is disapproved, the indication of the web content may remain on the user web content blacklist 164. Thus, the user may not be able to submit a duplicative web content access request while another same or similar web content access request is pending.

Method 400 can include, in response to determining that the requested web content is not approved (or is not explicitly disapproved) for viewing by the user, selecting an interactive challenge (block 414). In some embodiments, selecting an interactive challenge can include selecting an interactive challenge 140 that corresponds to the context of the request. For example, the browser application 112 may select an interactive challenge 140 from one or more interactive challenges 140 (e.g., stored locally on the user device 104) that corresponds to one or more context factors of the request, such as the age of the user 108, the gender of the user 108, one or more preferences of the user 108, a skill level of the user 108, past interactions of the user 108 with interactive challenges 140, and/or the like. For example, if the user 108 is determined to be a 6-year-old boy, the browser application 112 may select an interactive challenge 140 from the above described second set of interactive challenges 140 for boys ages 5-7 years old. As a further example, if the user 108 is determined to be a 6-year-old boy interested in cowboys, the browser application 112 may select an interactive challenge 140 from the second set of interactive challenges 140 for boys ages 5-7 years old that is also related to cowboys. As a further example, if the user 108 is determined to be a 6-year-old boy who is interested in cowboys and has a high skill level, the browser application 112 may select an interactive challenge 140 from the above described third set of interactive challenges 140 that are difficult to complete, and that is also related to cowboys. As yet another example, if the user 108 is determined to be a 6-year-old boy who is interested in cowboys and it is determined that he has recently had difficulty completing interactive challenges 140 from the third set of interactive challenges 140, the browser application 112 may select an interactive challenge 140 from the above described second set of moderately difficult interactive challenges 140 and that is related to cowboys. As a further example, if the user 108 is determined to be a 6-year-old boy and that he has recently been completing interactive challenges 140 relatively quickly (e.g., in less than 10 seconds), the browser application 112 may select an interactive challenge 140 that is associated with a longer time to successfully complete, such as a maze that is expected to take about 1 minute to complete. Selecting longer challenges that introduce a delay may help to reduce the rate (or frequency) of web content access requests 208 sent to the application server 102 and/or the corresponding rate of web content approval requests 210 ultimately sent to the parent user 108. In some embodiments, a delay may be introduced between consecutive requests to provide a similar delay. For example, a user 108 may only be allowed to submit one web content access request per hour. In some embodiments, a user 108 may be limited to a certain number of web content access requests. For example, a user 108 may only be allowed to submit up to five web content access requests per day.

Method 400 can include presenting a selected interactive challenge (block 416). In some embodiments, presenting the selected interactive challenge can include the browser application 112 causing display of the selected interactive challenge 140 on the user device 104. For example, if the browser application 112 selects the above described interactive challenge 140 for moving a displayed cowboy hat from a head of a cowboy to a head of a horse (e.g., interactive challenge 140a), the browser application 112 may render the content of the interactive challenge 140 to cause the user device 104 to display a challenge graphical user interface (GUI) that includes instructions stating the following: "You are not allowed to see this website. Place the cowboy hat on the head of the horse to ask your parents for permission to view the website." A cowboy wearing a cowboy hat and riding a horse is depicted, that allows the user to select and move the cowboy hat from the cowboy to the head of the horse, as described with regard to at least FIG. 3. Thus, the user may be provided with an opportunity to read the instructions and complete the challenge by performing the associated action of moving the cowboy hat from the cowboy to the head of the horse.

Method 400 can include determining whether the interactive challenge has been completed successfully (block 418). In some embodiments, determining whether the interactive challenge has been completed successfully can include the browser application 112 determining whether the user 108 has performed the requested actions in a given time frame. For example, if the user 108 is required to complete the challenge in 1 minute or less, the browser application 112 may determine that the user 108 has completed the interactive challenge 140a if the user 108 has performed the associated action of moving the cowboy hat from the cowboy to the head of the horse (e.g., if the user 108 placed his/her finger on the cowboy hat and slid his/her finger across the screen onto (or near) the horse's head) within 1 minute or less of the interactive challenge 140a being displayed. In contrast, the browser application 112 may determine that the user 108 has not completed the interactive challenge 140 if the user 108 has not performed the associated action of moving the cowboy hat from the cowboy to the head of the horse within 1 minute or less of the interactive challenge 140a being displayed.

Method 400 can include, in response to determining that the interactive challenge has not been completed successfully, inhibiting access to the web content (block 412). In some embodiments, inhibiting access to the web content (block 412) can include, for example, blocking user access to the web content as described herein. Continuing with the above example, if it is determined that the user 108 has not completed the interactive challenge 140 presented as a result of attempting to navigate to the ESPN™ website, the browser application 112 may not display the home page for the ESPN™ website, and/or may not allow the user 108 to navigate to or view any of the pages of the ESPN™ website. In some embodiments, if it is determined that the user 108 has not completed the interactive challenge 140, an "unsuccessful challenge" page can be displayed that includes an indication that the user 108 is inhibited from accessing the web content, an indication that the user 108 failed to successfully complete the interactive challenge 140, a user selectable link to retry the interactive challenge 140 and/or to try a new interactive challenge 140, and/or a listing of suggested related web content that is approved. For example, the browser application 112 may display a page that states: "You are not allowed to view this website," along with a hyperlink to a home page for the ESPN™ for kids website (e.g., "www.espnkids.com"), and a hyperlink to reattempt the same interactive challenge 140a and/or another interactive challenge 140.

Method 400 can include, in response to determining that the interactive challenge has been completed successfully, sending a web content access request (block 420). In some embodiments, sending a web content access request can include the browser application 112 sending a web content access request 208 to the application server 102. The web content access request 208 may identify at least the user 108 and/or the web content for which access is being requested. For example, in response to determining that the user 108 has completed the interactive challenge 140 presented as a result of user 108 attempting to navigate to the ESPN website on the user device 104, the browser application 112 of the user device 104 may send a web content access request 208 to the application server 102 that identifies the user 108 and the web content that the user 108 is requesting access to (e.g., the web content access request 208 may identify the user 108a, John, the ESPN™ website and/or the home page of the ESPN™ website). As described herein, the application server 102 may generate a corresponding web content approval request 210 that is provided to a monitor (e.g., a parent of the user 108a), may receive a corresponding monitor decision message 214 that indicates whether the requested access was approved or denied, and may return a corresponding access message 216 to the user device 104. The access message 216 may indicate that the requested access was approved or denied.

Method 400 can include determining whether the requested access has been approved (block 422). In some embodiments, determining whether the requested access to the web content has been approved can include the browser application 112 determining whether an access message 216 has been received that indicates approval of the requested access to the web content. In some embodiments, the browser application 112 can determine that approval has been received if an access message 216 has been received that indicates approval of the requested access to the web content. For example, the browser application 112 may determine that approval has been received if the browser application 112 receives an "approved" access message 216 from the application server 102 that indicates approval of the requested access to the ESPN™ website. In some embodiments, the browser application 112 can determine that approval has not been received if an access message 216 has been received that indicates disapproval of the requested access to the web content and/or that approval of the requested access to the web content has not been received within a threshold period of time (e.g., 1 week). For example, the browser application 112 may determine that approval has not been received if the browser application 112 receives a "disapproved" access message 216 from the application server 102 that indicates disapproval of the requested access to the ESPN™ website, or the browser application 112 does not receive an access message 216 that indicates approval of the requested access to the ESPN™ website from the application server 102 within 1 week of the corresponding web content access request 208.

Method 400 can include, in response to determining that the requested access has not been approved, inhibiting access to the web content (block 412). In some embodiments, inhibiting access to the web content (block 412) can include, for example, blocking user access to the web content. Continuing with the above example, if it is determined that the requested access to the ESPN™ website has not been approved, the browser application 112 may not display the home page for the ESPN™ website, and may not allow the user 108 to navigate to or view any of the pages of the ESPN™ website. In some embodiments, if it is determined that the requested access has not been approved, a "disapproved" page can be displayed that includes an indication that the user 108 is inhibited from accessing the web content, an indication that access has not been approved and/or has been denied, and/or a listing of suggested related web content that is approved. For example, the browser application 112 may display a page that states: "Your request to view this website has not been approved," along with a hyperlink to a home page for the ESPN™ for kids website (e.g., "www.espnkids.com") that is listed on the user whitelist 162, and a hyperlink to reattempt the same interactive challenge 140a and/or another interactive challenge 140. Such a "disapproved" page may be displayed each time the user 108 subsequently tries to access the web content for at least a threshold period of time (e.g., for the next month).

Method 400 can include, in response to determining that the requested access has been approved, enabling access to the web content (block 424). In some embodiments, enabling access to the web content can include the browser application 112 enabling the user 108 to access the web content using the user device 104. Continuing with the above example, in response to receiving the "approved" access message 216, the browser application 112 may allow the user 108 to navigate to some or all of the webpages of the ESPN™ website (e.g., some or all of the webpages hosted by an ESPN™ web server 103), as described with regard to block 406. In some embodiments, the web content can be added to the user whitelist 162. For example, the browser application 112 may add the ESPN™ website (e.g., an entry, such as a hyperlink and/or address, such as www.espn.com/* for the ESPN™ website) to the list of approved web content in the user whitelist 162 stored locally on the user device 104. Thus, the next time the user 108 attempts to access a webpage on the ESPN website, the user 108 may be provided with access to the website, as described herein with regard to block 406. In some embodiments, the user 108 may be provided with an indication that access to the web content has been approved. For example, the browser application 112 may display a status message to the user 108 that indicates whether the requested access has been approved. Such a status message may state, for example, "Your requested access to the ESPN™ website has been approved. You can navigate to the website using the following link www.espn.com."

FIG. 5 is a flow diagram that illustrates an example method 500 for managing access to web content in accordance with one or more embodiments. In some embodiments, some or all of the operations of method 500 can be performed by an application server 102 (e.g., some or all of the operations of method 500 can be performed by the access management module 120).

Method 500 can include receiving a web content access request (block 502). In some embodiments, receiving a web content access request can include the access management module 120 receiving a web content access request 208 from a user device 104. Continuing with the above example, the access management module 120 may receive the above described web content access request 208 that identifies the user 108 and the web content that the user 108 is requesting access to (e.g., the web content access request 208 may identify the user 108a, John, the ESPN website, and/or the home page for the ESPN website) from the user device 104.

Method 500 can include sending a web content approval request to a monitor (block 504). In some embodiments, sending a web content approval request to a monitor can include the access management module 120 identifying the user 108 responsible for monitoring access to web content by the user 108, identifying a user device 104 associated with that user 108, and sending a corresponding web content approval request 210 to the user device 104. For example, if the web content access request 208 is determined to be received from a user device 104a and/or a user 108a, the access management module 120 may determine that the parent user 108b (Jane) is responsible for monitoring the access to web content by the child user 108a (e.g., based on Jane being listed as a monitor in John's user profile 148), and may send a corresponding web content approval request 210 to the user device 104b. The web content approval request 210 may identify the child user 108a and the web content to which access is being requested (e.g., the web content approval request 210 may identify John and the ESPN™ website). In some embodiments, the web content approval request 210 can include other information that may be relevant to the monitor's decision, such as the number of times children have requested access to the same or similar web content and/or the approval/disapproval percentage by other monitors. As described herein, this information can be provided along with the request so that a monitor (e.g., a parent) can make an informed decision regarding approving or disapproving the requested access to the web content.

Method 500 can include determining whether approval of the web content approval request has been received (block 506). In some embodiments, determining whether approval of the web content approval request has been received can include the access management module 120 determining whether a monitor decision message has been received that indicates approval of the requested access to the web content. In some embodiments, the access management module 120 can determine that approval has been received if an "approval" monitor decision message 214 has been received that indicates approval of the requested access to the web content. For example, the access management module 120 may determine that approval has been received if the access management module 120 receives an approval monitor decision message 214 from the user device 104b that indicates approval of the requested access to the ESPN™ website. In some embodiments, the access management module 120 can determine that approval has been not received if an access message 216 that indicates disapproval of the requested access to the web content has been received and/or an access message 216 that indicates approval of the requested access to the web content has not been received within a threshold period of time (e.g., 1 week). For example, the access management module 120 may determine that approval has not been received if the access management module 120 receives a disapproval monitor decision message 214 from the user device 104b that indicates disapproval of the requested access to the ESPN website, or does not receive an approval monitor decision message 214 that indicates approval of the requested access to the ESPN™ website from the application server 102 within 1 week of the corresponding web content access request 208.

Method 500 can include, in response to determining that approval of the web content approval request has been received, sending a corresponding approval access message (block 508). In some embodiments, sending a corresponding approval access message can include the access management module 120 sending an approval access message 216 to the corresponding user device 104. For example, in response to receiving the approval monitor decision message 214 indicating approval for the user 108a (John) to access the ESPN™ website, the access management module 120 may send to the user device 104a an approval access message 216 that includes an indication that the user 108a is approved to access the ESPN™ website.

Method 500 can include, in response to determining that approval of the web content approval request has not been received, sending a corresponding disapproval access message (block 510). In some embodiments, sending a corresponding disapproval access message can include the access management module 120 sending a disapproval access message 216 to the corresponding user device 104. For example, in response to receiving an approval monitor decision message 214 indicating disapproval for the user 108*a* (John) to access the ESPN™ website, the access management module 120 may send to the user device 104*a* a disapproval access message 216 that includes an indication that the user 108*a* is not approved to access the ESPN™ website.

FIG. 6 is a flow diagram that illustrates an example method 600 for managing access to web content in accordance with one or more embodiments. In some embodiments, some or all of the operations of method 600 can be performed by a parent's (or monitor's) user device 104 (e.g., some or all of the operations of method 600 can be performed by the web content access management application ("management application") 114 of the user device 104*b*).

Method 600 can include receiving a web content approval request (block 602). In some embodiments, receiving a web content approval request can include the management application 114 of a user device 104 receiving a web content approval request 210 from the application server 102. Continuing with the above example, the management application 114 may receive the above described web content approval request 210 that identifies the user 108 and the web content that the user 108 is requesting access to (e.g., the web content approval request 210 that identifies the user 108*a*, John, the ESPN™ website and/or the home page for the ESPN™ website) from the application server 102.

Method 600 can include querying a monitor for a decision on the web content approval request (block 604). In some embodiments, querying a monitor for a decision on the web content approval request can include the management application 114 causing presentation of a request for a monitor user 108 to approve or disapprove the access to the web content that is requested in the web content approval request 210. For example, the management application 114 may cause the user device 104*b* to display a monitoring GUI that enables the user 108*b* (Jane) to submit a decision on whether or not to approve the access to the ESPN™ website that is requested by the user 108*a* (John). The monitoring GUI may state, for example, "John is requesting access to the ESPN™ website" and may provide first and second interactive elements (e.g., first and second buttons) that are selectable to approve or disapprove, respectively, the access to the ESPN™ website requested by John. In some embodiments, the monitoring GUI can include other information (e.g., provided in the web content approval request 210) that may be relevant to the decision, such as the number of times children have requested access to the web content and/or the approval/disapproval percentage by other parents or other monitors. This information can be provided so that a monitor can make an informed decision regarding approving or disapproving the requested access to the web content.

Method 600 can include determining whether the web content approval request has been approved (block 606). In some embodiments, determining whether the request has been approved can include the management application 114 determining whether the monitor has selected to approve or disapprove the requested access. For example, the management application 114 may determine that the web content approval request is approved if the user 108*b* selects the first interactive element to approve the requested access, and may determine that the web content approval request is not approved if the user 108*b* selects the second interactive element to disapprove the requested access or a response has not been provided within a threshold period of time (e.g., within 1 week of the web content approval request 210 being sent to the user device 104*b* and/or being presented to the user 108*b*).

Method 600 can include, in response to determining that the web content approval request has been approved, sending a corresponding monitor decision message (block 608). In some embodiments, sending a corresponding monitor decision message can include the management application 114 sending an approved monitor decision message 214 to the application server 102. For example, the management application 114 may send to the application server 102 an approved monitor decision message 214 that includes an indication that the user 108*a* is approved to access the ESPN™ website. Method 600 can include, in response to determining that the web content approval request has not been approved, sending a corresponding monitor decision message (block 610). In some embodiments, sending a corresponding monitor decision message can include the management application 114 sending a disapproved monitor decision message 214 to the application server 102. For example, the management application 114 may send to the application server 102 a disapproved monitor decision message 214 that includes an indication that the user 108*a* is not approved to access the ESPN™ website.

It will be appreciated that the processes and methods described herein are example embodiments of processes and methods that may be employed in accordance with the techniques described herein. The processes and methods may be modified to facilitate variations of their implementation and use. The order of the processes and methods and the operations provided therein may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described herein.

Figure 7:
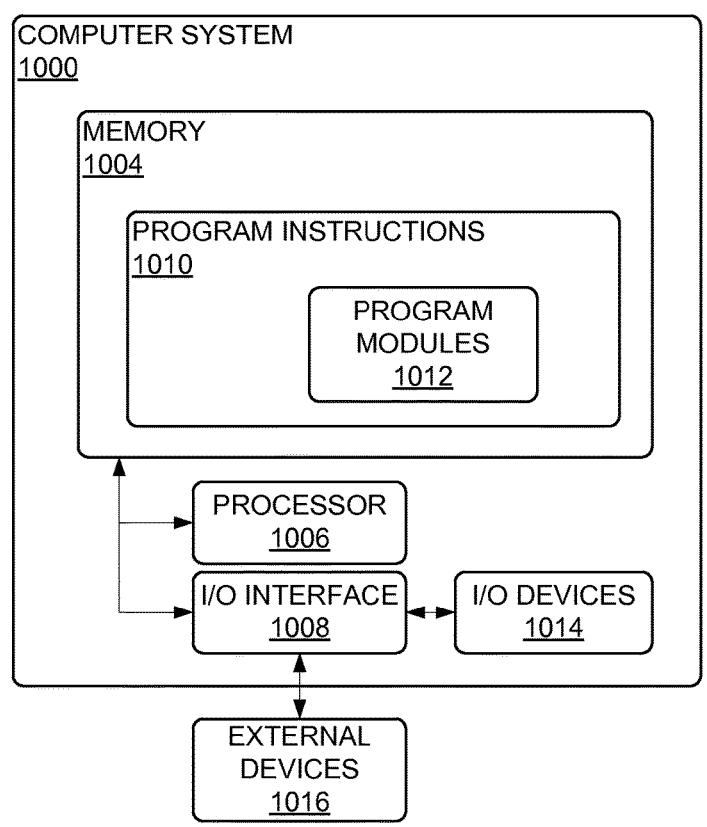
FIG. 7 is a diagram that illustrates an example computer system in accordance with one or more embodiments.

FIG. 7 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including those described with regard to the process 200 and the methods 400, 500 and 600. In the context of a computer system of a user device 104, the program modules 1012 may include one or more user device modules (e.g., a web browser application 112 and/or a web content access management module 114) for performing some or all of the operations described with regard to a user device 104. In the context of the application server 102, the program modules 1012 may include one or more content server modules (e.g., a web content access management module 120) for performing some or all of the operations described with regard to the application server 102.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 1006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, a transceiver, and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method for controlling access to websites, the method comprising:
   receiving, by a user device and from a user, a request to access a webpage of a website;
   comparing, by the user device, an address of the website to a list of approved website addresses for the user to determine whether the website is approved for access by the user, the list of approved website addresses being stored locally on the user device;
   determining, by the user device, that the website is not approved for access by the user based on the address of the website not being on the list of approved website addresses;
   determining demographics of the user using a user account;
   determining that the user has completed a threshold number of interactive challenges within a preceding time interval;
   determining an expected length of time to complete an interactive challenge for the user based on determining that the user has completed the threshold number of interactive challenges;
   selecting, by the user device and based on the demographics and the expected length of time, an interactive challenge for the user at a difficulty level associated with the demographics of the user, wherein the expected length of time is greater than a length of time to complete a previous interactive challenge;
   presenting, by the user device, the interactive challenge;
   determining, by the user device, that the user has successfully completed the interactive challenge;
   sending, by the user device to a server, a website access request comprising an indication of the user and the website, wherein the website access request is configured to be submitted to a supervisor of the user for approval;
   receiving, by the user device and from the server, an indication that the website is approved for access by the user; and
   providing, by the user device, the user with access to the webpage of the website.

2. The method of claim 1, wherein the user is a child of the supervisor.

3. The method of claim 1, further comprising:
   receiving, by the user device and from the user, a second request to access a second webpage of a second website;
   comparing, by the user device, an address of the second website to the list of approved website addresses for the user to determine whether the second website is approved for access by the user;
   determining, by the user device, that the second website is not approved for access by the user based on the address of the second website not being on the list of approved website addresses;
   presenting, by the user device, a second interactive challenge to the user, wherein the second interactive challenge comprises a textual description of actions for the user to perform to complete the second interactive challenge;

determining, by the user device, that the user has not successfully completed the second interactive challenge;

determining, by the user device, to not send to the server, a second website access request to be submitted to the supervisor of the user for approval; and preventing, by the user device, access to the second website by the user.

4. The method of claim 1, further comprising:

receiving, by the user device and from the user, a second request to access a second webpage of a second website;

comparing, by the user device, the address of the second web site to the list of approved website addresses for the user to determine whether the second website is approved for access by the user;

determining, by the user device, that the second website is approved for access by the user based on the address of the second website being on the list of approved website addresses; and providing, by the user device, the user with access to the second website.

5. A method, comprising:

receiving, by a user device, a request to provide a user with access to web content;

determining that the user could have one or more cognitive conditions;

determining that the web content is not approved for access by the user;

determining one or more attributes of the user;

determining that the user has completed a threshold number of interactive challenges within a preceding time interval;

determining an expected length of time to complete an interactive challenge for the user based on determining that the user has completed the threshold number of interactive challenges;

selecting, based on the one or more attributes and the expected length of time, an interactive challenge for the user at a difficulty level associated with the one or more attributes of the user, wherein the expected length of time is greater than a length of time to complete a previous interactive challenge;

presenting, by the user device, the interactive challenge;

determining that the user has successfully completed the interactive challenge;

sending, by the user device, a web content access request comprising an indication of the user and the web content;

receiving, by the user device, an indication that the web content is approved for access by the user; and providing, by the user device, the user with access to the web content.

6. The method of claim 5, wherein the interactive challenge comprises a textual description of actions.

7. The method of claim 6, further comprising:

receiving user input indicative of user interactions with the interactive challenge, wherein determining that the user has successfully completed the interactive challenge comprises determining that the user interactions with the interactive challenge are consistent with the actions described in the textual description.

8. The method of claim 6, further comprising:

determining an arrangement of words of the textual description based at least in part on the difficulty level.

9. The method of claim 5, wherein determining the one or more attributes of the user comprises determining an age of the user, and wherein selecting the interactive challenge for the user comprises selecting the interactive challenge for the user that corresponds to the age of the user.

10. The method of claim 5, wherein determining that the user could have one or more cognitive conditions comprises determining that the user is attempting to access the web content from at least one of a device or an application that is associated with individuals having the one or more cognitive conditions.

11. The method of claim 5, wherein determining that the user could have one or more cognitive conditions comprises determining that the user is of an age that is less than a threshold age.

12. The method of claim 5, wherein the web content access request is configured to be submitted to a supervisor of the user for approval, and wherein the indication that the web content is approved for access by the user is provided at least partially in response to approval of the web content by the supervisor.

13. The method of claim 5, wherein determining that the web content is not approved for access by the user comprises determining that an address of the web content is not contained in a listing of approved web content addresses.

14. The method of claim 5, further comprising:

receiving, by the user device, a request to provide the user with access to second web content;

determining that the web content is not approved for access by the user;

presenting, by the user device, a second interactive challenge;

in response to determining that the user has not successfully completed the second interactive challenge;

determining, by the user device, to not send a second web content access request; and preventing, by the user device, access to the second web content by the user.

15. The method of claim 5, further comprising:

receiving, by the user device, a request to provide the user with access to second web content;

determining that the second web content is approved for access by the user;

determining that the second web content is approved for access by the user; and providing, by the user device, the user with access to the second web content.

16. A system, comprising:

at least one processor; and a memory comprising program instructions stored thereon that are executable by the at least one processor to cause:

receiving a request to provide a user with access to web content;

determining that the user could have one or more cognitive conditions;

determining that the web content is not approved for access by the user;

determining one or more attributes of the user;

determining that the user has completed a threshold number of interactive challenges within a preceding time interval;

determining an expected length of time to complete an interactive challenge for the user based on determining that the user has completed the threshold number of interactive challenges;

selecting, based on the one or more attributes and the expected length of time, an interactive challenge for the user at a difficulty level associated with the one or more attributes of the user, wherein the expected length of time is greater than a length of time to complete a previous interactive challenge;

presenting the interactive challenge;

determining that the user has successfully completed the interactive challenge;

sending a web content access request comprising an indication of the user and the web content;

receiving an indication that the web content is approved for access by the user; and providing the user with access to the web content.

17. The system of claim 16, wherein the interactive challenge comprises a textual description of actions.

18. The system of claim 16, wherein determining that the user could have one or more cognitive conditions comprises determining that the user is attempting to access the web content from at least one of a device or an application that is associated with individuals having the one or more cognitive conditions.

19. The system of claim 16, wherein determining that the user could have one or more cognitive conditions comprises determining that the user is of an age that is less than a threshold age.

20. The system of claim 16, wherein determining that the web content is not approved for access by the user comprises determining that an address of the web content is not contained in a listing of approved web content addresses.

\* \* \* \* \*